Dec. 6, 1960  A. HALE ET AL  2,962,753
TAKE-OFF MECHANISM FOR PLASTIC MILLS
Filed Jan. 2, 1959  2 Sheets-Sheet 1
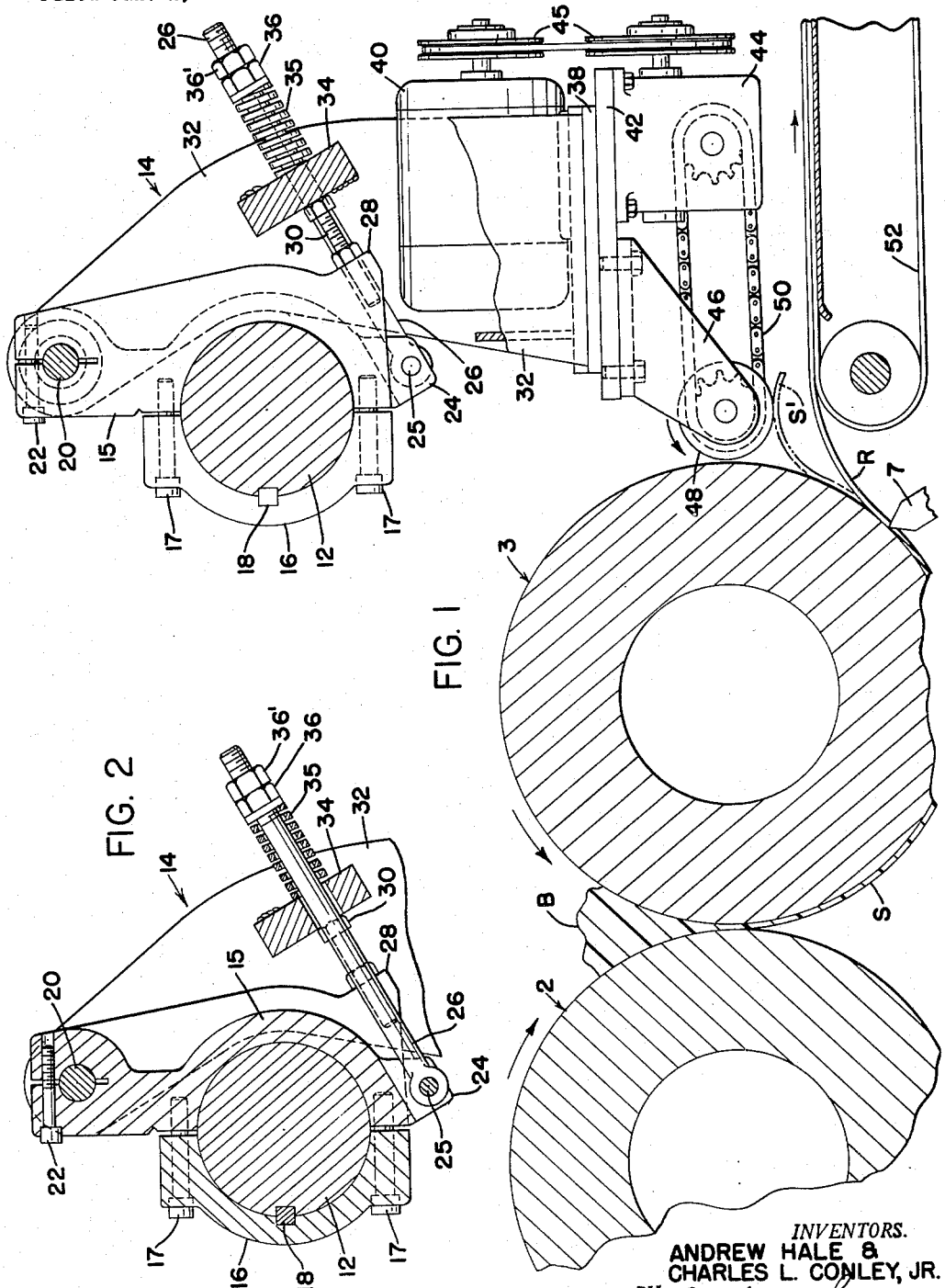
INVENTORS.
ANDREW HALE &
CHARLES L. CONLEY, JR.
BY
ATTORNEYS Dec. 6, 1960 A. HALE ET AL 2,962,753
TAKE-OFF MECHANISM FOR PLASTIC MILLS
Filed Jan. 2, 1959 2 Sheets-Sheet 2

INVENTORS.
ANDREW HALE &
CHARLES L. CONLEY, JR.
BY
ATTORNEYS

United States Patent Office 2,962,753
Patented Dec. 6, 1960

2,962,753

TAKE-OFF MECHANISM FOR PLASTIC MILLS

Andrew Hale, Akron, and Charles L. Conley, Jr., Cuyahoga Falls, Ohio, assignors, by mesne assignments, to Blaw-Knox Company, Pittsburgh, Pa., a corporation of Delaware Filed Jan. 2, 1959, Ser. No. 784,716

6 Claims. (Cl. 18—2)

The present invention relates to improvements in take-off mechanisms for plastic stocks which have been sheeted out on calenders or mills. While the mechanism has been designed for the removal of a strip or ribbon from a continuous mill such as shown in the copending application of Andrew Hale and Harold G. Bailey, Serial No. 784,758, filed January 2, 1959, it may be used on all types of mills or calenders which are intended to process or sheet out rubber stocks, whether natural, synthetic or reclaimed rubber, or mixtures thereof. The device is also used in conjunction with the milling of other plastic materials which are processed similarly to rubber.

The object of the invention is to improve upon take-off mechanisms with a view to more positive action requiring less supervision. The device is operated in conjunction with an off-bearing conveyor which may conduct the stock directly to an extruder or tubing machine. Once the take-off mechanism has started the stock onto the conveyor, the stock will continue to be conducted off the mill by the conveyor.

In the drawings, the take-off is shown as applied to a continuous mill such as shown in the Hale and Bailey application aforesaid, and reference may be had to said application. In the mill such as shown, a continuous supply of stock is progressively processed on the mill, the unprocessed stock being fed to the mill at one end and the processed stock removed at the other end of the mill where the take-off mechanism is located. The amount of stock in the mill is kept constant so that there will be an unbroken ribbon of stock removed from the mill so long as it is in operation.

In the accompanying drawings the preferred form of the invention is shown in detail as applied to a horizontal mill, but it will be understood that changes and improvements may be made therein within the scope of the invention. The mechanism may be modified so as to operate with other types of mills and with calenders.

In the drawings:

Fig. 1 is a vertical section taken at the delivery end of a horizontal continuous mill showing the take-off device in position.

Fig. 2 is a partial vertical section taken along another plane through the mechanism for holding the take-off device in position.

Figure 3:
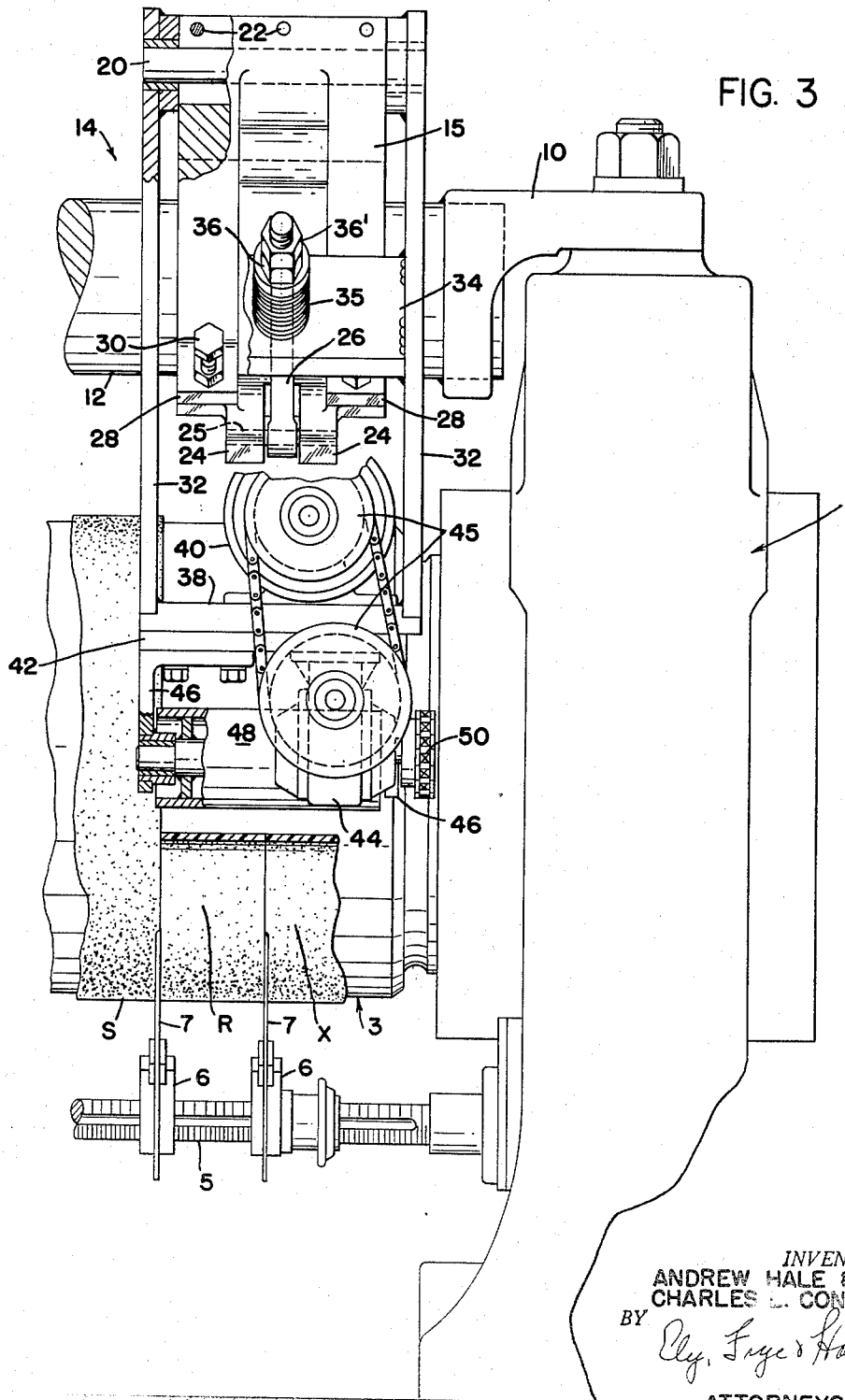
Fig. 3 is a front elevation of the parts shown in Fig. 1.

In the drawings, the numeral 1 indicates the end frame of the horizontal continuous mill, a corresponding frame being located at the other end of the mill. In the frames are mounted the pair of mill rolls, 2 being known as the feed roll and 3 the work roll which carries the sheet of stock being worked. These rolls are adjustable with respect to one another so as to vary the width of the bite between the rolls which controls the thickness of the sheet of stock S. Both rolls are cored for the circulation of a heating or cooling medium as required by the particular type of stock being processed.

Across the lower part of the mill adjacent the work roll is the transverse shaft 5, along which are mounted the two knife holders 6 which carry the blades 7 that bear against the stock to cut a strip or ribbon R therefrom. The holders 6 are adjustable along the shaft so as to vary the width of the strip. The blades are set in from the extreme outer edge of the stock so as to provide a marginal strip X which may be returned to the mill. This insures that there will always be a full strip R removed from the mill.

On the top of each end frame is secured a bracket 10, in which are fixed the ends of the transverse shaft 12 which supports the take-off unit. The take-off unit comprises a framework indicated generally by the numeral 14, one part of which consists of the bracket 15 which partially surrounds the shaft 12, being held thereon by a cap plate 16 and bolts 17. The cap plate is keyed to the shaft 12 as at 18.

The bracket extends upwardly above the shaft 12 and is split to receive and hold a transverse shaft 20, to which it is held by bolts 22. The lower side of the bracket is formed with two parallel lugs 24 across which is a shear pin 25. Shear pin 25 is received in the eye of a stay bolt 26 which holds the two portions of the framework together, the shear pin being provided as a safety measure should some obstacle come between the take-off roll and the work roll. At the side of the bracket are located the two lugs 28 in which are threaded bolts 30, which determine the minimum spacing between the work roll and the take-off roll.

The other portion of the framework 14 is composed of two parallel arms 32 which are located at opposite sides of the bracket 15 and are pivoted at their upper ends on the projecting ends of the shaft 20. A transverse plate 34 is welded to the arm 32, the under surface of which bears against the heads of the bolts 30 providing a stop for the framework 14 when the take-off roll is at its innermost position.

The stay bolt 26 is extended through the plate 34 and around it is the heavy coil spring 35 which is held in adjusted position by the adjusting nut 36 and the lock nut 36'. The spring 35 urges the transverse plate 34 against the heads of bolts 30.

Across the lower ends of the arms 32 is welded the plate 38, to the top of which is secured the motor 40. To the underside of the plate 38 is attached a second plate 42 from which is suspended a transmission unit 44. A variable speed pulley arrangement, shown at 45, drives the unit from the motor. To the underside of the plate 42 are secured the brackets 46 in which is rotatably mounted the take-off roll 48 which is driven by the sprocket and chain connecton 50 from the unit 44. Beneath the take-off roll is the off-bearing conveyor 52 which is driven at the same or slightly higher speed than the work roll.

In the form of the invention shown herein the roll 48 is the full width of the strips R and X which means that both strips are removed by the take-off roll and delivered to the conveyor 52, in which event the two strips are later separated, the strip R going to an extruder or tubing machine or the like (not shown), which is thus assured of a constant supply of thoroughly milled stock. The strip X may be conveyed back to the feed end of the mill for recirculating through the mill. In some forms of the invention, where it is desired to remove the strip R only, the roll 48 will be the width of the strip or slightly less and the strip X will be allowed to return to the bite directly.

The roll 48 is a steel roll which is driven in the opposite direction from the adjacent surface of the work roll. Its surface is held in yielding contact with the stock on the work roll by the coil spring 35, but at a distance substantially less than the thickness of the stock, which spacing is determined by the setting of the bolts 30, it being essential that the take-off roll does not touch the work roll. For example, if the stock on the work roll is running somewhere between 3/16 to 1/8 of an inch, the face of the take-off roll is usually maintained at approximately .060 inch from the surface of the work roll. In starting the mill in operation, the lead end S' of the sheet of stock enters between the take-off roll and work roll, and the reversely rotating take-off roll directs the stock onto the conveyor 52 as indicated in phantom lines in Fig. 1. Thereafter the stock is taken directly from the work roll 3 by the off-bearing conveyor, as indicated in full lines in Fig. 1.

Another method of starting the mill is to hold the take-off roll away from the stock until the stock has covered the work roll and the knives 7 have been placed in position to cut the strips. The take-off roll is then moved into position with its framework against the stop bolts 30, severing the strips of stock transversely so that the ends of the strips will fall on the off-bearing conveyor which will conduct them away from the mill, as has been described.

The operation for a narrow take-off roll which removes only the strip R is the same with either method except that the marginal strip is permitted to stay on the work roll.

What is claimed is:

1. In a machine for processing plastic stocks the combination of a rotatable work roll about which the stock is formed as a sheet, means to cut a strip of stock on the work roll, a take-off roll for bearing against said strip of stock, means yieldingly urging said take-off roll against said strip of stock, stop means to hold the take-off roll at a distance from the surface of the work roll less than the thickness of the stock, and means to drive the take-off roll in a direction opposite to the direction of rotation of the work roll to direct the strip of stock away from the work roll.

2. In a machine for processing plastic stocks the combination of a rotatable work roll about which the stock is formed as a sheet, means to cut a strip of stock on the work roll, a take-off roll for bearing against said strip of stock, means yieldingly urging said take-off roll against said strip of stock, stop means to hold the take-off roll at a distance from the surface of the work roll less than the thickness of the stock, means to drive the take-off roll in a direction opposite to the direction of rotation of the work roll to direct the strip of stock away from the work roll, and a conveyor located adjacent to the take-off roll to receive the strip from the work roll.

3. In a machine for processing plastic stocks the combination of a rotatable work roll about which the stock is formed as a sheet, means to cut a strip of stock on the work roll, a take-off roll for bearing against said strip of stock, means for pressing said take-off roll against said strip of stock to pinch off said strip, and means to drive the take-off roll in a direction opposite to the direction of rotation of the work roll to direct said pinched off strip away from the work roll.

4. In a machine for processing plastic stocks the combination of a rotatable work roll about which the stock is formed as a sheet, means to cut a strip of stock on the work roll, a take-off roll for bearing against said strip of stock, means for pressing said take-off roll against said strip of stock to pinch off said strip, stop means to limit movement of the take-off roll toward the work roll at a distance from the surface of the work roll less than the thickness of the stock, and means to drive the take-off roll in a direction opposite to the direction of rotation of the work roll to direct said pinched off strip away from the work roll.

5. In a machine for processing plastic stocks the combination of a rotatable work roll about which the stock is formed as a sheet, means to cut a strip of stock on the work roll, a take-off roll for bearing against said strip of stock, means yieldingly urging said take-off roll against said strip of stock at a pressure sufficient to pinch off said strip, means to drive said take-off roll in a direction opposite to the direction of rotation of the work roll, and a conveyor located adjacent to the take-off roll to receive the strip from the work roll.

6. In a machine for processing plastic stocks the combination of a rotatable work roll about which the stock is formed as a sheet, means to cut a strip of stock on the work roll, a take-off roll for bearing against said strip of stock, means yieldingly urging said take-off roll against said strip of stock at a pressure sufficient to pinch off said strip, stop means to limit movement of the take-off roll toward the work roll at a distance from the surface of the work roll less than the thickness of the stock, means to drive said take-off roll in a direction opposite to the direction of rotation of the work roll, and a conveyor located adjacent to the take-off roll to receive the strip from the work roll.

References Cited in the file of this patent

UNITED STATES PATENTS

| | | |
|---|---|---|
| 2,069,202 | Anderson et al. | Feb. 2, 1937 |
| 2,442,598 | Harrison et al. | June 1, 1948 |
| 2,446,771 | Knowland | Aug. 10, 1948 |
| 2,526,318 | Batin | Oct. 17, 1950 |